S. A. BRACKETT.
Furniture Casters.
No. 134,350.          Patented Dec. 31, 1872.
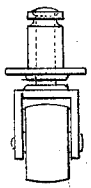
Fig. 1. Reduced.
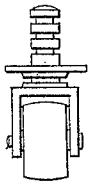
Fig. 3.
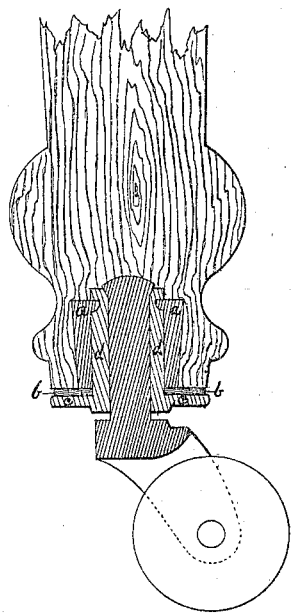
Fig. 4.
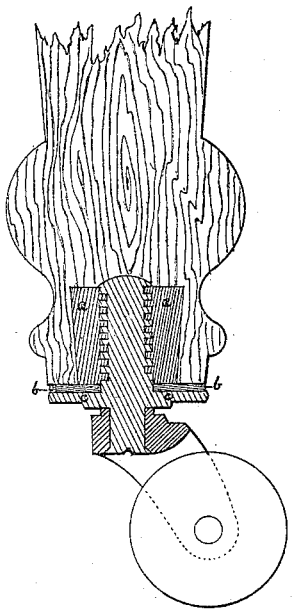
Fig. 2.
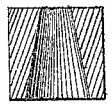
Fig. 5.
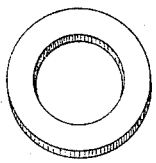
Fig. 6.
Witnesses.
James M. Keith
Geo. W. Porter
Inventor:
S. A. Brackett by his attys.
Hodges & Barnett

United States Patent Office.

SAMUEL A. BRACKETT, OF BOSTON, MASSACHUSETTS.

IMPROVEMENT IN FURNITURE-CASTERS.

Specification forming part of Letters Patent No. 134,350, dated December 31, 1872.

*To all whom it may concern:*

Be it known that I, SAMUEL A. BRACKETT, of the city of Boston, in the county of Suffolk, in the State of Massachusetts, have invented a new and useful Improvement in Casters for Furniture, of which the following is a specification:

My invention relates particularly to that class of furniture-casters having a metallic sleeve on the case, in which the spindle rotates, and to the mode of fastening on such a caster to the leg or other part to which it is to be attached; the object of the invention being to effect such fastening by means of a cylinder of India rubber or similar material inserted in the hole or socket in the leg, and into which the sleeve of the caster is forced and retained by the elasticity or adhesiveness of the rubber cylinder, aided by the form given to the sleeve.

The first part of my invention consists in making the sleeve or pintle of a caster cylindrical instead of tapering, as they are sometimes made, in combination with a cylindrical tube made (preferably by molding) of India rubber of medium elasticity or other suitable expansible material, and of the same length and about twice the diameter of the sleeve of the spindle, and having its bore of the same diameter at one end as the diameter of the sleeve, but gradually diminishing toward the other end, where its diameter is about one-half that of the sleeve. The parts described are combined and the caster is applied and fastened on as follows:

A hole is bored axially in the end of the leg or other part to which the caster is to be attached of a diameter and depth corresponding to the diameter and length of the rubber tube. This hole is then enlarged from its exterior inwardly, so that its largest interior diameter shall exceed by from one-sixteenth to one-eighth of an inch its exterior diameter. It is preferable that this enlargement should be uniform, making a socket corresponding to the frustum of a cone; but it answers ordinary purposes to make it with less nicety, effecting it—for example, with two or three cuts of a gouging-chisel. The hole being thus prepared the rubber tube is pressed into it, the end of the tube having the smaller bore being the end to be first entered in the hole. The sleeve of the spindle is then thrust through the rubber tube. The result is that the tube is sufficiently expanded, within the inwardly-enlarging socket in the leg, to form with it a secure dovetail connection, by means of which it (the tube) is firmly held in its place, and the contraction of the rubber upon the sleeve prevents it or the caster from being withdrawn from the tube. This last effect may be aided by making a groove around the sleeve, or by a screw-thread, or by raising points upon its surface, like those on a rasp, pointing downward, or in any other way making the surface rough without preventing the sleeve from being driven through the tube. The screw-thread is, perhaps, the best, inasmuch as while it accomplishes all the purposes of the other modes it is capable of being withdrawn at will. The caster is more firmly held by drawing it back a little after it has been forced through the rubber tube, as described, (the elasticity of the material admitting this,) say about one-sixteenth of an inch, and then springing in between the sleeve-plate and the end of the leg a rubber ring or washer of suitable thickness to fill the space. By this the irregularities (the points, grooves, screw-thread, and the like) on the sleeve are more effectually seized by the rubber, and the washer forms a good cushion for the sleeve-plate; or the rubber tube may be allowed to project from the socket about a sixteenth of an inch, and thus form a cushion between the leg and the caster-plate; but the washer and the cushion in any other form are unimportant.

My invention is also applicable to that class of casters in which the spindle or pintle does not rotate within a sleeve, but is forced into the leg as far as the caster-plate will allow, and made fast therein, the caster-carriage rotating horizontally therein by means of a swivel formed by extending the lower extremity through the bracket in which the caster-wheel rotates. In this case I employ and treat the said spindle or pintle as the sleeve is employed and treated in the foregoing description.

As my invention contemplates holding the caster in place by the contraction of the rubber, it is imperative that its horizontal rotation should be provided for either by swiveling the pintle or by a sleeve, as aforesaid, or some other equivalent device; for neither the pintle nor the sleeve can turn in the rubber tube for any practical purpose; but an elastic tube with a straight cylindrical bore may be used in combination with the casters described, and inserted in an inwardly-enlarging hole or socket like those before described, and the tube will contract around the sleeve and seize the said irregularities, and the caster will be held measurably fast in place. So, too, the tube may be made with a larger exterior diameter at one end than the other, (having either a cylindrical or conical bore,) and thrust larger end foremost into the said inwardly-enlarging socket; but these are only modifications of my invention of inferior consequence.

I do not confine myself to the cylindrical or circular forms of the parts shown in my drawing and described in the specification, although such are obviously the best forms in most cases; nor do I confine myself to the dimensions or relative dimensions of the parts given, which may be varied, according to judgment, in construction and use.

My improvement is inexpensive; it makes screws and screw-holes unnecessary; the tube and washer described diminish the liability of the parts to which the casters are applied to be split in putting on and in use, and afford an appreciable elasticity.

*Description of the Accompanying Drawing.*

Figures 1, 2, and 3 show the different forms of casters described. Fig. 4 is a longitudinal sectional view through the center of the caster, shown in Fig. 1 attached to a leg, and with the rubber tube and washer described in place, in which $a$ is the rubber tube, and $b$ the washer, $c$ the caster-plate, and $d$ the sleeve of the spindle. Fig. 5 is a longitudinal sectional view of the rubber tube with a gradually-diminishing bore. Fig. 6 shows the washer described.

*Claims.*

I claim as my invention—

1. The combination, with a caster constructed substantially as described, of a tube made of India rubber or other suitable elastic and expansible material, and inserted in the inwardly-enlarging socket of the leg or other part to which the caster is applied, substantially as and for the purposes set forth hereinbefore.

2. The combination, with a caster constructed substantially as described, of a tube made of India rubber or other suitable expansible and elastic material, and having a bore gradually diminishing in size from one end to the other, inserted in an inwardly-enlarging socket in the leg or other part to which the caster is applied, substantially as and for the purposes hereinbefore described.

SAMUEL A. BRACKETT.

Witnesses:
W. W. WHITCOMB,
WILLIAM STANDISH.